US012664125B2

(12) United States Patent
Baptist et al.

(10) Patent No.: US 12,664,125 B2
(45) Date of Patent: Jun. 23, 2026

(54) SOFT DELETION AND RESTORATION OF CLUSTERED FILE SYSTEMS

(71) Applicant: Dell Products L.P., Round Rock, TX (US)

(72) Inventors: Michael Baptist, Boise, ID (US); Steven Soumpholphakdy, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 0 days.

(21) Appl. No.: 18/980,406

(22) Filed: Dec. 13, 2024

(65) Prior Publication Data

US 2026/0169957 A1 Jun. 18, 2026

(51) Int. Cl.
| | |
|---|---|
| *G06F 17/30* | (2006.01) |
| *G06F 16/11* | (2019.01) |
| *G06F 16/16* | (2019.01) |
| *G06F 16/188* | (2019.01) |

(52) U.S. Cl.
CPC .......... *G06F 16/128* (2019.01); *G06F 16/162* (2019.01); *G06F 16/188* (2019.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | |
|---|---|---|---|---|
| 5,893,084 A | * | 4/1999 | Morgan | H04L 9/32 |
| | | | | 706/50 |
| 7,996,414 B2 | * | 8/2011 | Alpern | G06F 16/188 |
| | | | | 707/758 |
| 8,352,482 B2 | * | 1/2013 | Hansen | G06F 16/188 |
| | | | | 707/812 |
| 8,983,988 B2 | * | 3/2015 | Joshi | G06F 16/182 |
| | | | | 718/1 |
| 9,613,064 B1 | * | 4/2017 | Chou | G06F 16/182 |
| 2014/0181046 A1 | * | 6/2014 | Pawar | G06F 16/27 |
| | | | | 707/654 |
| 2014/0201162 A1 | * | 7/2014 | Kumarasamy | G06F 11/1469 |
| | | | | 707/679 |
| 2015/0199343 A1 | * | 7/2015 | Dabak | G06F 9/455 |
| | | | | 713/189 |
| 2016/0057041 A1 | * | 2/2016 | Gupta | G06F 11/301 |
| | | | | 709/224 |
| 2019/0332497 A1 | * | 10/2019 | Dethe | G06F 11/1484 |
| 2020/0401485 A1 | * | 12/2020 | Mitkar | G06F 11/1451 |

(Continued)

*Primary Examiner* — Hung D Le

(74) *Attorney, Agent, or Firm* — Amin, Turocy & Watson, LLP

(57) ABSTRACT

A method facilitating soft deletion and restoration of clustered file systems includes, in response to receiving an instruction to temporarily disable a computing cluster, creating, by a system including at least one processor, snapshots of volumes associated with a virtual machine (VM) of the computing cluster; generating, by the system, mapping data representative of a mapping between snapshot identifiers, of the snapshots of the volumes associated with the VM, and an instance identifier of the VM; and, in response to the mapping data being determined to have been successfully generated, deleting, by the system, the VM.

20 Claims, 10 Drawing Sheets

1000

In response to receiving a command to temporarily disable a computing cluster, create snapshots of volumes attached to a software-defined node of the computing cluster — 1002

Generate mapping data, representative of a mapping between snapshot identifiers, assigned to the snapshots of the volumes attached to the software-defined node, and a node identifier of the software-defined node — 1004

Un-instantiate, in response to the mapping data being determined to have been successfully generated, the software-defined node — 1006

(56) References Cited

U.S. PATENT DOCUMENTS

| | | | |
|---|---|---|---|
| 2020/0409803 A1* | 12/2020 | Naidu | G06F 11/1451 |
| 2021/0064485 A1* | 3/2021 | Rana | G06F 11/1464 |
| 2022/0291998 A1* | 9/2022 | Devaraj | G06F 3/0671 |
| 2022/0342847 A1* | 10/2022 | Singh | G06F 16/128 |
| 2024/0020203 A1* | 1/2024 | Govindan | G06F 11/1458 |
| 2024/0126584 A1* | 4/2024 | Bagchi | G06F 9/45558 |
| 2024/0248629 A1* | 7/2024 | Bhattacharya | G06F 3/0611 |
| 2024/0248816 A1* | 7/2024 | Saraswat | G06F 9/45558 |
| 2024/0354203 A1* | 10/2024 | Menezes | G06F 11/1464 |

* cited by examiner

200

Soft delete instruction

Snapshot module 110

Cluster shutdown module 210

Shutdown instruction

Computing cluster 10

VM(s) 20

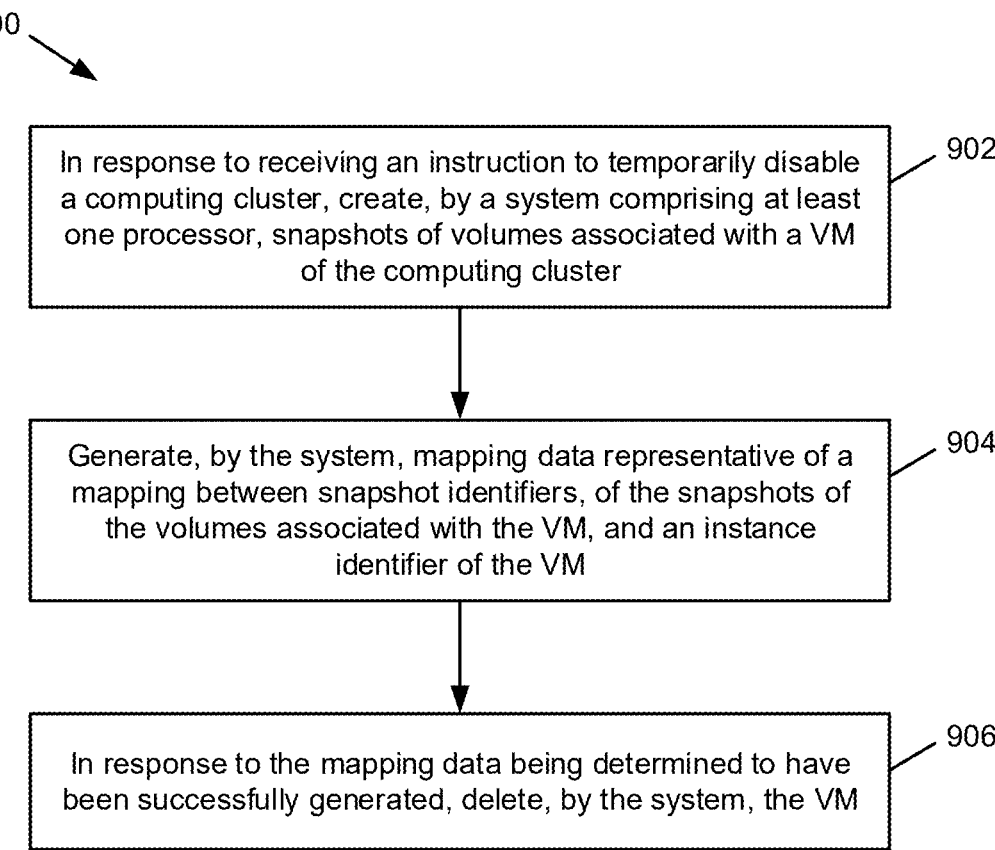

900

In response to receiving an instruction to temporarily disable a computing cluster, create, by a system comprising at least one processor, snapshots of volumes associated with a VM of the computing cluster                     902

Generate, by the system, mapping data representative of a mapping between snapshot identifiers, of the snapshots of the volumes associated with the VM, and an instance identifier of the VM                     904

In response to the mapping data being determined to have been successfully generated, delete, by the system, the VM                     906

FIG. 9

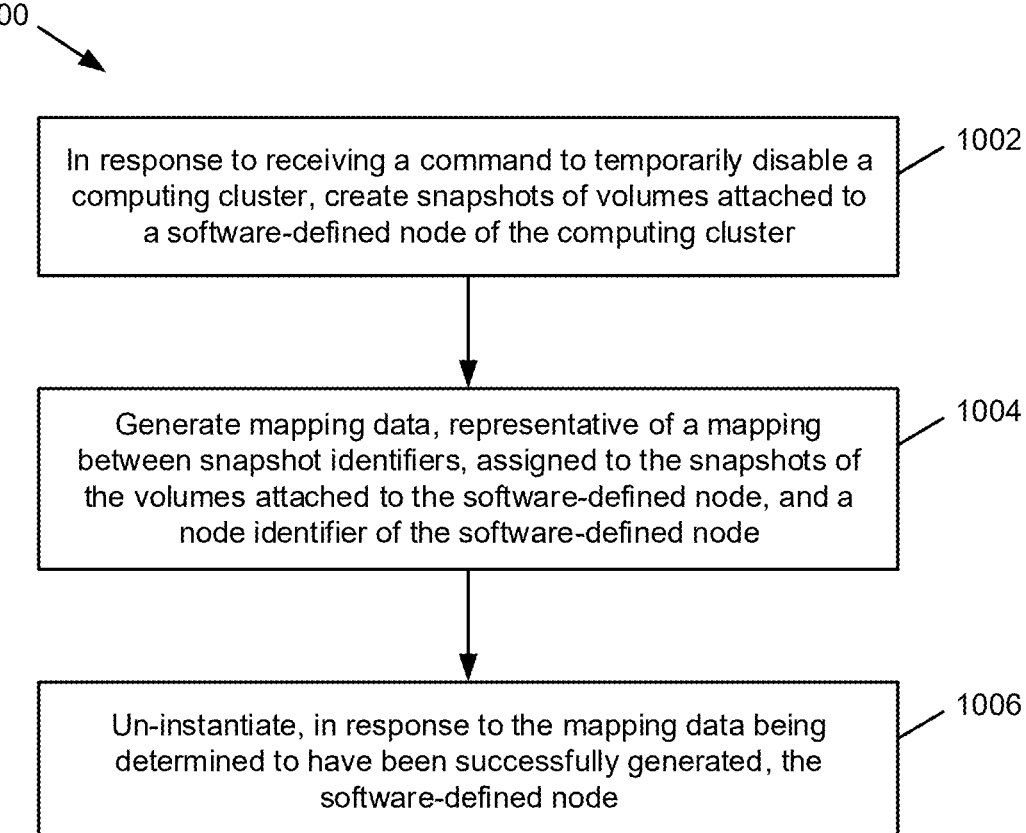

1000

1002

In response to receiving a command to temporarily disable a computing cluster, create snapshots of volumes attached to a software-defined node of the computing cluster

1004

Generate mapping data, representative of a mapping between snapshot identifiers, assigned to the snapshots of the volumes attached to the software-defined node, and a node identifier of the software-defined node

1006

Un-instantiate, in response to the mapping data being determined to have been successfully generated, the software-defined node

FIG. 10

SOFT DELETION AND RESTORATION OF CLUSTERED FILE SYSTEMS

BACKGROUND

For computing clusters, such as those deployed in the cloud pursuant to an as-a-service model, there can be scenarios in which it is desirable to remove access to a cluster while still retaining its data such that the cluster can be restored at a later time. Such an operation can be referred to as "soft deletion," e.g., to contrast with a "hard" deletion in which the cluster and all of its data are irrevocably deleted.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an implementation, a system is described herein. The system can include at least one processor and at least one memory that stores executable instructions that, when executed by the at least one processor, facilitate performance of operations. The operations can include, in response to receiving a command to temporarily disable a computing cluster, creating snapshots of volumes associated with a virtual machine (VM) of the computing cluster. The operations can further include generating mapping data, representative of a mapping between snapshot identifiers, assigned to the snapshots of the volumes associated with the VM, and an instance identifier assigned to the VM. The operations can additionally include, in response to the mapping data being determined to have been successfully generated, un-instantiating the VM.

In another implementation, a method is described herein. The method can include, in response to receiving an instruction to temporarily disable a computing cluster, creating, by a system including at least one processor, snapshots of volumes associated with a VM of the computing cluster. The method can further include generating, by the system, mapping data representative of a mapping between snapshot identifiers, of the snapshots of the volumes associated with the VM, and an instance identifier of the VM. The method can also include, in response to the mapping data being determined to have been successfully generated, deleting, by the system, the VM.

In an additional implementation, a non-transitory machine-readable medium is described herein that can include instructions that, when executed by at least one processor, facilitate performance of operations. The operations can include, in response to receiving a command to temporarily disable a computing cluster, creating snapshots of volumes attached to a software-defined node of the computing cluster; generating mapping data, representative of a mapping between snapshot identifiers, assigned to the snapshots of the volumes attached to the software-defined node, and a node identifier of the software-defined node; and un-instantiating, in response to the mapping data being determined to have been successfully generated, the software-defined node.

DESCRIPTION OF DRAWINGS

Various non-limiting embodiments of the subject disclosure are described with reference to the following figures, wherein like reference numerals refer to like parts throughout unless otherwise specified.

FIGS. 9-10 are flow diagrams of respective methods that facilitate soft deletion and restoration of clustered file systems in accordance with various implementations described herein.

DETAILED DESCRIPTION

Figure 1:
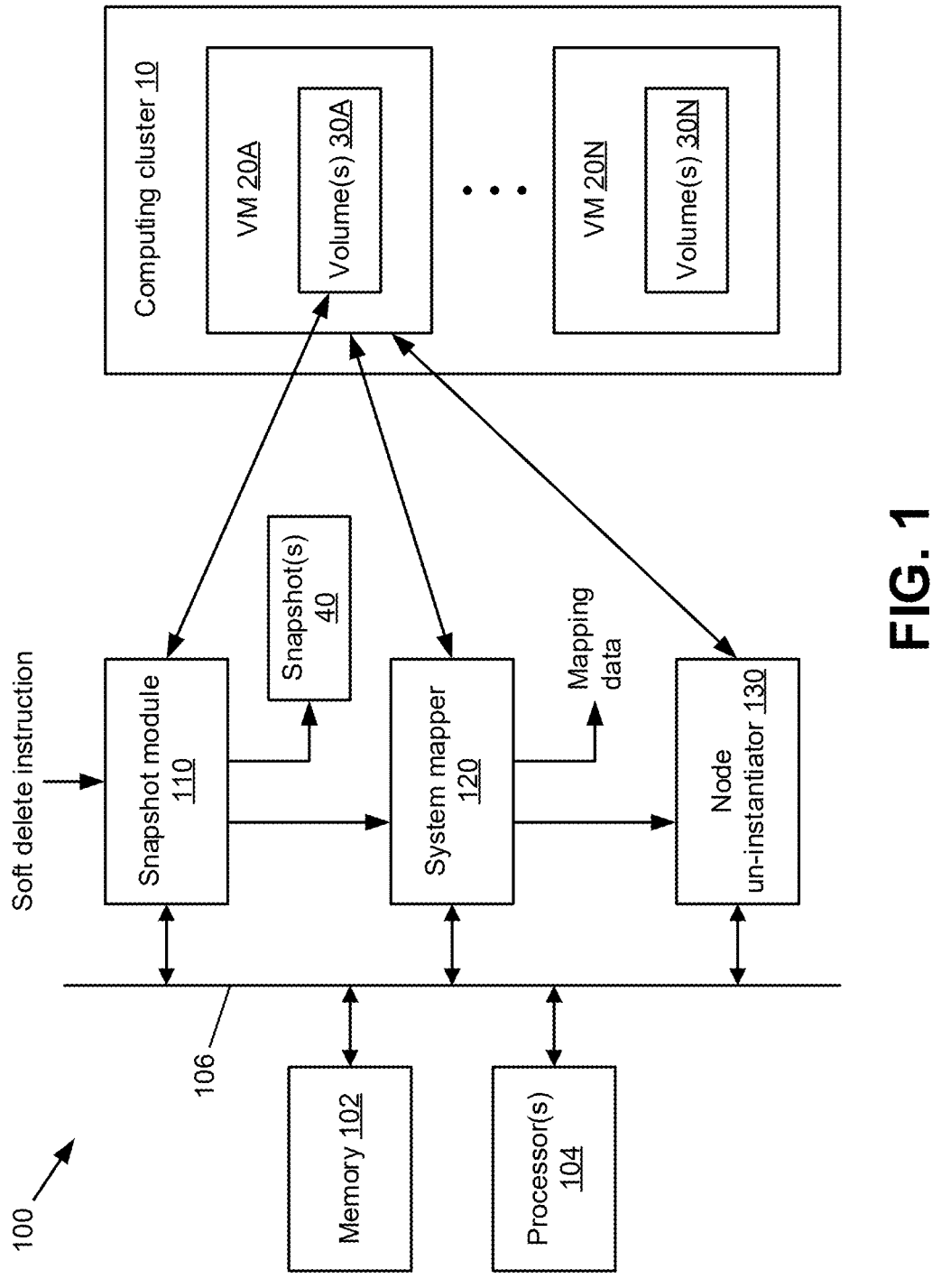
FIGS. 1-6 are block diagrams of respective systems that facilitate soft deletion and restoration of clustered file systems in accordance with various implementations described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring subject matter.

Various implementations described herein can provide techniques to facilitate temporarily disabling a computing cluster, referred to herein as a "soft delete" of the cluster, and subsequently restoring a soft deleted computing cluster. In this regard, in order to facilitate soft deletion of a cluster, it is desirable to implement techniques that protect retained data in an efficient manner and with minimal associated infrastructure costs. While various implementations are described herein in the context of cloud-native systems, it is noted that implementations as described herein could be used to facilitate soft deletion and restoration of any suitable computing cluster that contains software-defined compute nodes and runs a clustered file system, and that neither this description nor the claimed subject matter are intended to be limited to any particular type of cluster deployment unless explicitly stated otherwise.

In computing clusters associated with as-a-service (aaS) deployments, whether hosted on a cloud computing platform or otherwise, there are scenarios in which a user of an aaS deployment no longer has use for their cluster and will request deletion. Upon receiving confirmation that the user indeed wishes to delete their cluster, the underlying orchestration engine will proceed with deleting all resources tied to the cluster such that the data will no longer be retained. This process is referred to as a "hard delete."

In contrast, there are other scenarios for aaS deployments in which a soft delete of a cluster is desirable, such as scenarios in which user has deployed a cluster but a term for use of the cluster has expired or payment has not been received from the user for use of the cluster. In such a scenario, the user can be prevented from accessing the cluster in a manner that retains their data. In doing so, the cluster and data can be made available to the user again once the user extends their term, provides payment, or otherwise returns to good standing.

Because soft deletion of a computing cluster involves retaining the data associated with the cluster, there are costs to an aaS platform provider associated with maintaining cluster resources during a time in which the cluster remains soft deleted. For instance, connectivity to the cluster could simply be removed, e.g., by disabling the network interface cards (NICs) associated with the cluster and/or shutting down the cluster, but in doing so the aaS platform provider will still be responsible for the virtual machine (VM) and volume costs tied to the cluster during the time in which it is disabled. Also or alternatively, VMs of the cluster can be shut down and deallocated, but this would still result in ongoing costs associated with maintaining the volumes.

To the furtherance of the above and/or related ends, various implementations described herein provide techniques to disable a computing cluster, e.g., such that a user of the computing cluster does not have access to their cluster or data, while ensuring that the data associated with the cluster is not lost. Implementations as described herein can achieve this in a manner that both reduces the cost to an associated aaS platform provider while the cluster is dormant and also facilitates easy recovery of the cluster to an operable state at a later time.

By utilizing one or more implementations as described herein, a computing cluster can be temporarily disabled and/or re-enabled using automated processes that can operate at a higher level of complexity than is possible to be performed manually by a human, e.g., due to the number of calculations and/or other operations performed in parallel, the number of compute nodes and/or volumes that can be processed simultaneously, and/or other factors. Additionally, implementations described herein can facilitate automation of highly technical tasks that are inherently and/or inextricably tied to computer technology and cannot be implemented outside of a computing environment, such as tasks associated with storage volume management, data migration, VM instantiation and de-instantiation, or other aspects of computing system management. As a result, by utilizing one or more automated techniques facilitated by implementations described herein, cluster management tasks for an associated computing system can be initiated via actions such as pressing a button on a user interface, inputting a simple command, or performing other comparable actions, or automatically in response to various triggering events such as expiration of a defined term, even if an operator of the system lacks the requisite knowledge to perform those tasks manually.

With reference now to the drawings, FIG. 1 illustrates a block diagram of a system 100 that facilitates soft deletion and restoration of clustered file systems in accordance with various implementations described herein. System 100 as shown in FIG. 1 includes executable components, e.g., a snapshot module 110, a system mapper 120, and a node un-instantiator 130, each of which can operate as described in further detail below. In an implementation, the components 110, 120, 130 of system 100 can be implemented in hardware, software, or a combination of hardware and software. By way of example, the components 110, 120, 130 can be stored on at least one memory (e.g., a memory 102) and executed by at least one processor (e.g., processor(s) 104). An example of a computer architecture including a processor and memory that can be used to implement the components 110, 120, 130, as well as other components as will be described herein, is shown and described in further detail below with respect to FIG. 11. As further shown in FIG. 1, the executable components 110, 120, 130, the memory 102, the processor 104, and/or other elements of system 100 can communicate with each other via a bus 106 and/or other components that provide intercommunication between various elements of system 100.

Additionally, it is noted that the functionality of the respective components shown and described herein can be implemented via a single computing device and/or a combination of devices. For instance, in various implementations, the snapshot module 110 shown in FIG. 1 could be implemented via a first device, the system mapper 120 could be implemented via the first device or a second device, and the node un-instantiator 130 could be implemented via the first device, the second device, or a third device. Also, or alternatively, the functionality of a single component could be divided among multiple devices in some implementations.

As will be described in further detail below, the components 110, 120, 130 of system 100 can interact with a computing cluster 10 that includes one or more VMs 20, here N VMs 20A-20N. It is noted that the numbering convention utilized for the VMs 20 in FIG. 1 is not intended to imply any specific number of VMs 20, and that the computing cluster 10 could include any suitable number of VMs 20, including one VM 20 or multiple VMs 20. It is also noted that while VMs 20 are illustrated in FIG. 1, the computing cluster 10 could utilize and/or otherwise include any suitable type of software-defined compute nodes in addition to, or in place of, the VMs 20 shown in FIG. 1. In an implementation in which the computing cluster 10 utilizes software-defined compute nodes that are not VMs, the components 110, 120, 130 of system 100 could interact with those compute nodes in a similar manner to that described below with reference to interactions with the VMs 20 shown in FIG. 1.

As further shown in FIG. 1, each of the VMs 20 of the computing cluster 10 can be associated with one or more volumes 30, shown in FIG. 1 as volumes 30A-30N corresponding to respective ones of the VMs 20A-20N. While volume(s) 30 corresponding to each VM 20 of the computing cluster 10 are shown in FIG. 1 as a single block for clarity of illustration, it is noted that each VM 20 in the system can have any suitable number of volumes 30, including one volume or multiple volumes. Additionally, in some implementations, respective VMs 20 in the computing cluster 10 can be associated with uniform and/or differing numbers of volumes 30. Further, a "volume" as used in this context can refer to a storage device, such as a real or virtual storage drive (e.g., hard disk drive (HDD), solid state drive (SSD), etc.), or a portion of a storage device, such as a partition or the like, that can operate as a distinct storage unit.

The computing cluster 10 shown in FIG. 1 can be associated with a computing system that is managed by an entity, such as an aaS platform provider, for use by a third-party user, i.e., a user that is distinct from the managing entity of the system. In some implementations, the computing cluster 10 can be implemented on a cloud computing platform, and the components 110, 120, 130 of system 100 can interact with the computing cluster 10 through one or more application programming interfaces (APIs), such as a platform API (PAPI), associated with the cloud computing platform. Also or alternatively, the components 110, 120, 130 of system 100 can interact and/or otherwise communicate with the computing cluster 10 via any suitable wired and/or wireless communication technology or combination of technologies.

With reference now to the components of system 100, the snapshot module 110 can, in response to receiving a command to temporarily disable a computing cluster 10 (e.g., a command to soft delete the computing cluster 10), create snapshots 40 of volumes 30 associated with a VM 20 of the computing cluster 10. The system mapper 120 of system 100 can then generate mapping data, representative of a mapping between snapshot identifiers assigned to the snapshots 40 generated by the snapshot module 110 and an instance identifier assigned to the VM 20. Stated another way, the system mapper 120 can generate data that maps respective snapshots 40, generated by the snapshot module 110 from volumes 30 of a VM 20, to the VM 20 associated with those snapshots 40 and volumes 30. Subsequently, in response to the mapping data being determined to have been successfully generated by the system mapper 120, the node un-instantiator 130 of system 100 can un-instantiate the VM 20.

While FIG. 1 illustrates only interactions between the components 110, 120, 130 of system 100 and a single VM 20A in the computing cluster 10 for clarity of illustration, it is noted that the components 110, 120, 130 of system 100 can operate as described above to process and un-instantiate each VM 20 of the computing cluster 10, e.g., in series and/or in parallel. For instance, as part of executing a soft delete instruction for the computing cluster 10, the components 110, 120, 130 can repeat the operations described above for each VM 20 in the computing cluster 10 until all VMs 20 of the computing cluster 10 have been successfully un-instantiated. Following successful un-instantiation of each VM 20 of the computing cluster 10, the node un-instantiator 130 and/or another suitable component of system 100 can tear down the computing cluster 10 to complete execution of the soft delete instruction. In an implementation, at any time after successful soft deletion of the computing cluster 10, the soft delete can be undone to recover access to the cluster and its data, e.g., as will be described in further detail below with respect to FIGS. 3-4.

Figure 2:
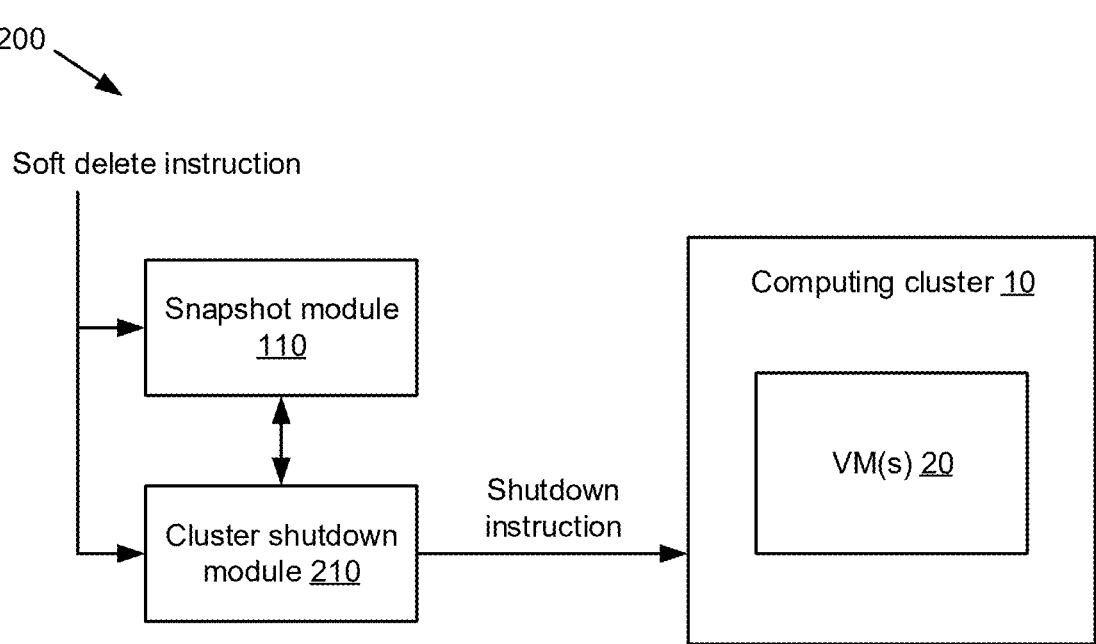

With reference now to FIG. 2, a block diagram of another system 200 that facilitates soft deletion and restoration of clustered file systems is illustrated. Repetitive description of like parts described above with regard to other implementations is omitted for brevity. System 200 as shown in FIG. 2 includes a cluster shutdown module 210 that can receive an instruction or command to soft delete and/or otherwise temporarily disable a computing cluster 10 in addition to, or in place of, a snapshot module 110 as described above with respect to FIG. 1. In response to receiving such an instruction, the cluster shutdown module 210 can shut down the computing cluster 10. In an implementation, operation of the snapshot module 110 and/or other components of system 100 as described above with respect to FIG. 1 can commence in response to the computing cluster 10 being successfully shut down by the cluster shutdown module 210.

In an implementation, a soft delete instruction can be provided to the cluster shutdown module 210 based on soft deletion of a computing cluster 10 being initiated by an aaS platform associated with the computing cluster 10, and/or upon satisfaction of other suitable criteria. In response to this instruction, the cluster shutdown module 210 can, in some implementations, make a PAPI call to initiate a shutdown of the computing cluster 10 with an additional argument to inform the computing cluster 10 that it will be soft deleted. Informing the cluster 10 that it is to be soft deleted can ensure that each VM 20 and/or other node of the cluster 10, prior to those VMs 20 and/or other nodes being shut down, will touch a file on their respective root file systems to be seen upon recovery during run control startup scripts. Additional details regarding this file, and its use during recovery, are provided below with reference to FIGS. 5-6.

As part of shutting down each of the VMs 20 and/or other nodes of the cluster 10, the cluster shutdown module 210 can ensure that each VM 20 of the cluster 10 flushes any outstanding input/output (I/O) and saves its file system journal onto an operating system disk associated with the VM 20 and/or one or more remote disks prior to shutting down. As a result of these actions, each VM 20 of the cluster 10 can have a journal, consistent with the drives associated with the VM 20, in a journal backup partition on its operating system disk and/or one or more remote disks. This can ensure consistency between the journal and the drives of each VM 20, e.g., to facilitate full recovery of the cluster 10 at a later time (e.g., as will be described below with respect to FIGS. 3-4).

Returning now to FIG. 1, after the cluster has successfully been shut down, the components 110, 120, 130 of system 100 can iterate through each VM 20 and/or other node in the cluster 10 to prepare each node for the soft delete. More particularly, for each node in the cluster 10, system 100 can perform one or more of the following actions:

1) Create, via the snapshot module 110, a snapshot 40 for each of the volumes 30 of a given node. To this end, the snapshot module 110 can utilize any suitable technique for generating a snapshot 40 containing the data of a given volume 30, including techniques presently known as well as those developed in the future. In an implementation, the snapshot module 110 can create a snapshot 40 using different media type(s) than the media type(s) associated with the corresponding volumes 30. For instance, in an implementation in which the volumes 30 associated with a given VM 20 are associated with a first type of storage media (e.g., SSDs, etc.), the snapshot module 110 can create the snapshots 40 for those volumes 30 using a second, different type of storage media (e.g., HDDs, etc.). This can be done, e.g., to reduce the cost of maintaining the snapshots 40 during a time in which the cluster 10 is disabled. On subsequent recovery, the volumes 30 can be reconstructed from the snapshots 40 onto the same type of media on which the volumes 30 were originally deployed to facilitate reconstruction of the cluster 10 at its original performance specifications. Further details regarding the recovery process are described below with reference to FIGS. 3-4.

2) Create, via the system mapper 120, a mapping between a VM instance identifier associated with the node and the snapshot identifiers for all of the volumes, including operating system and data volumes, associated with that node. This mapping data can subsequently be used on recovery to ensure that the same volumes that are associated with a given node prior to a soft delete are attached to that node upon recovery.

3) Within the mapping data created by the system mapper 120 in the above step, also include the NIC info for that given node, such as the primary network address of the NIC and/or other suitable information. This information, in addition to other mapping information generated by the system mapper 120, can be utilized upon subsequent recovery of the cluster 10 to replicate the configuration of the cluster 10 as it existed prior to the soft delete. For instance, in an implementation in which the primary internet protocol (IP) address or other network address for NICs is immutable, the system mapper 120 can retain the NIC information for each of the nodes of the cluster 10 to ensure that the NICs will continue to route traffic correctly upon recovery.

Once the system mapper 120 has a mapping for all of the VMs 20 of the cluster 10 to their NIC info, snapshot identifiers, and/or other suitable properties, the system mapper 120 can additionally save off the virtual network (vNET) associated with the cluster 10, subnet information, topology information, and/or any other information deemed by system 100 to be desirable for retaining the configuration of the cluster 10 and/or the infrastructure on which it is implemented. Topology information for the cluster 10, in this context, can include information such as the number of VMs 20 in the cluster 10, a count of the volumes 30 associated with each of the VMs 20 of the cluster 10, respective sizes of those volumes 30, and/or other suitable information.

Once the system mapper 120 has saved all of the relevant mapping and configuration data for the cluster 10, the node un-instantiator 130 can proceed with tearing down the VMs 20, vNET, and volumes 30 for the soft deleted cluster 10. As a result of these operations, the cluster 10 can be disabled, and the data associated with the cluster 10 and its cluster configuration can be stored by the snapshots 40. From the snapshots 40, an aaS platform associated with system 100 can have all of the information needed to be able to bring up a new cluster as if it was the now-deleted cluster.

Figure 3:
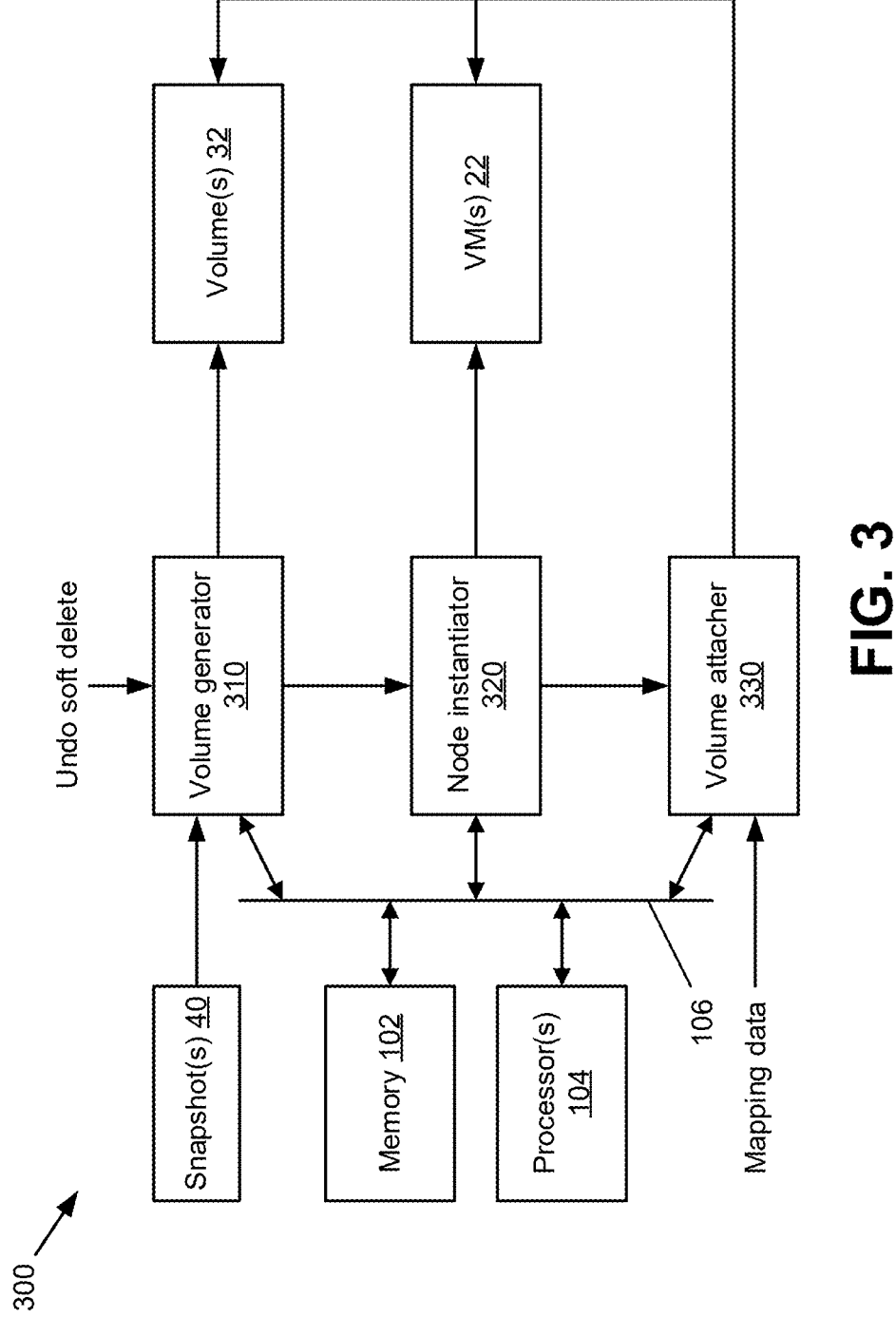

Referring now to FIGS. 3, a block diagram of still another system 300 that facilitates soft deletion and restoration of clustered file systems is illustrated. Repetitive description of like parts described above with regard to other implementations is omitted for brevity. System 300 as shown in FIG. 3 includes a volume generator 310, a node instantiator 320, and a volume attacher 330, which can facilitate restoration of a previously deleted computing cluster 10 (not shown in FIG. 3), e.g., in response to an instruction to undo a soft delete of the cluster 10. In various implementations, the components 310, 320, 330 of system 300 can be stored on at least one memory (e.g., a memory 102) and executed by at least one processor (e.g., processor(s) 104), e.g., in a similar manner to the components 110, 120, 130 of system 100 as described above with respect to FIG. 1.

With reference to the components of system 300 shown in FIG. 3, the volume generator 310 can create new volumes 32 from respective ones of snapshots 40 generated during soft deletion of a cluster 10, e.g., as described above with reference to FIG. 1. Additionally, the node instantiator 320 can instantiate one or more new VMs 22, and the volume attacher 330 can attach, based on mapping data generated for the original cluster 10, the newly generated volumes 32 to the newly instantiated VMs 22. While the volumes 32 and VMs 22 are shown in FIG. 3 as distinct from the volumes 30 and VMs 20 described above with respect to FIG. 1, it is noted that the volumes 32 and VMs 22 shown in FIG. 3 can be generated by system 300 such that, from the perspective of a system user, there are no differences between the original volumes 30 and the new volumes 32, and/or between the original VMs 20 and the new VMs 22.

In an implementation, when an instruction to undo a soft delete for a computing cluster is received, system 300 can facilitate re-deployment of the cluster. To do so, the networking environment of the cluster can first be recreated, e.g., using the saved vNET and subnet information based on the mapping data generated by the system mapper 120 as described above and/or other suitable saved data.

Following recreation of the networking environment, the node instantiator 320 can cycle through each of the nodes in the VM to snapshot identifier mapping (e.g., as given by the mapping data shown in FIG. 3) to create and start new VMs 22 with their expected operating system disk and data drives. To do this, the volume generator 310 can iterate through all of the snapshots 40 associated with a VM 22 to create new volumes 32 from the snapshots 40. The new volumes 32 can be created such that the new volumes 32 match the previously created volumes 30 (as shown in FIG. 1) in terms of volume size, storage media type (e.g., HDD, SSD, etc.), and/or other properties. Once all volumes 32 have been created, the node instantiator 320 can then start a VM 22, and the volume attacher 330 can attach the volumes 32 to the VM 22.

Figure 4:
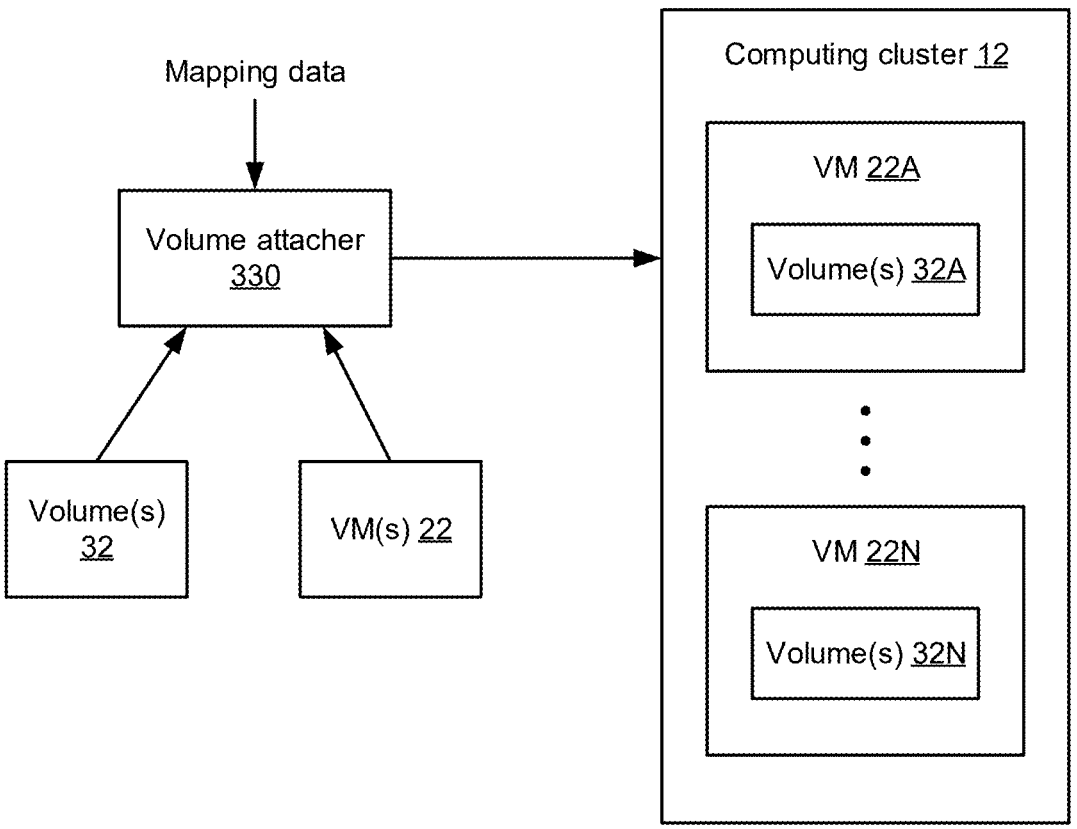

An example end result of the operations performed by system 300 is shown by FIG. 4. As FIG. 4 illustrates, volumes 32 created for respective snapshots 40 can be attached to VMs 22 by the volume attacher 330, after which a new computing cluster 12 with the new VMs 22 and volumes 32 can be activated. Similar to the VMs 22 and volumes 30, the new cluster 12 can be configured such that, from the perspective of a system user, there are no differences between the original cluster 10 (as shown in FIG. 1) and the new cluster 12.

Figure 5:
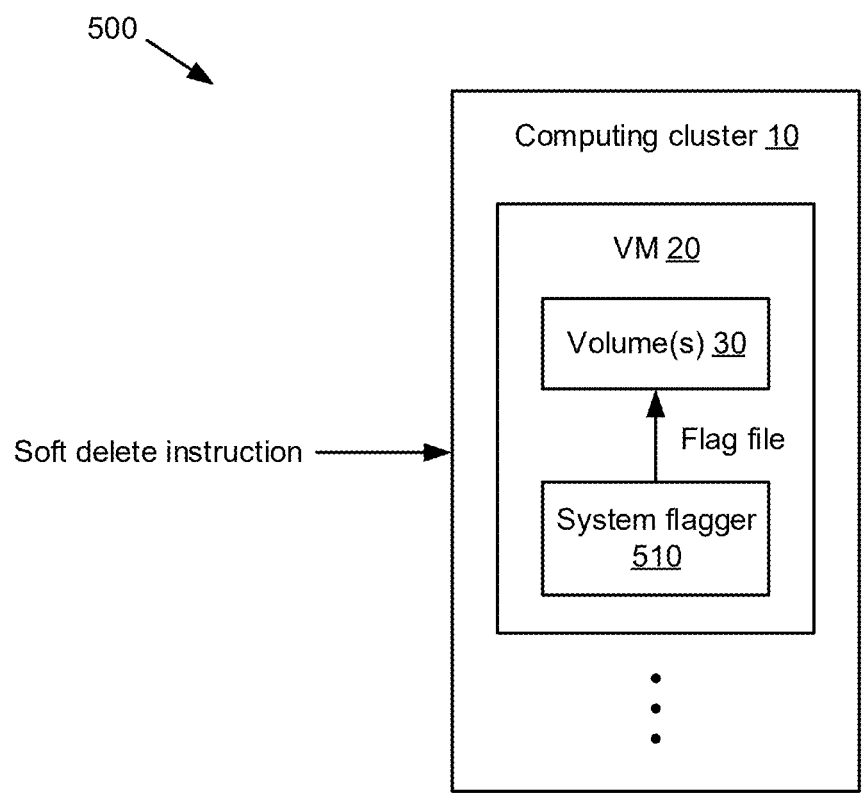
Figure 6:
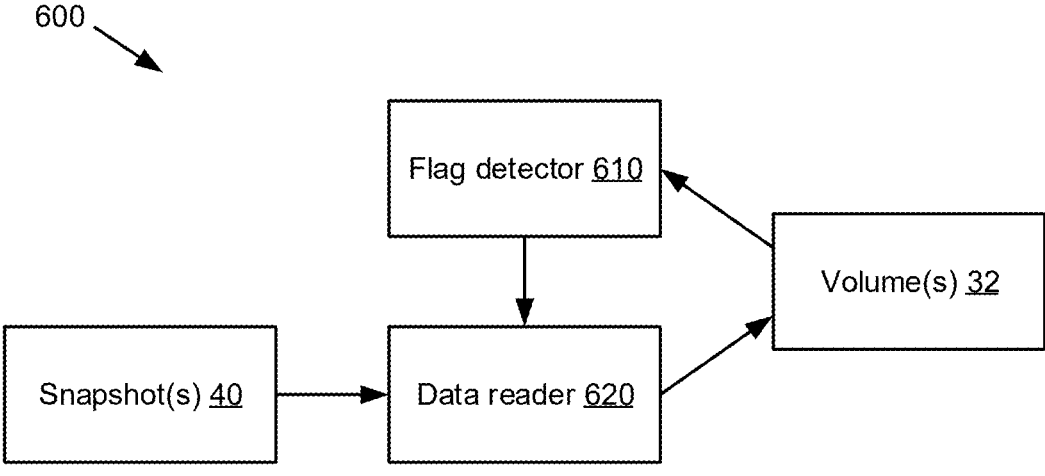

Referring next to FIGS. 5-6, respective systems 500, 600 are shown that can improve the efficiency of new volume creation and computing cluster restoration. With reference first to system 500 as shown in FIG. 5, each VM 20 in a computing cluster 10 can include a system flagger 510 that can, in response to the cluster 10 receiving a soft delete instruction, write a flag file (or another suitable flag or indication) to a root file system of the VM 20. For instance, as shown in FIG. 5, the system flagger 510 of the VM 20 can write a flag file to a volume 30 of the VM 20 of the cluster that serves as an OS disk for the VM 20. While only one VM 20 is shown in FIG. 5 for simplicity of illustration, it is noted that the cluster 10 could include any suitable number of VMs 20, each of which could include a system flagger 510 as shown in FIG. 5. In an implementation, flag files or other indications can be written by the system flagger 510 as shown in FIG. 5 prior to shutting down the cluster 10, e.g., to indicate that a soft delete (e.g., as opposed to a hard delete) is to be performed for the cluster 10.

During cluster recovery, new volumes 32 can be created based on respective snapshots, e.g., by a volume generator 310 as described above with respect to FIG. 3. Subsequently, as shown by system 600 in FIG. 6, when a cluster node is booted from an OS residing on one of the volumes 32 (e.g., a volume 32 serving as the OS disk for the cluster node), the OS can detect, e.g., via a flag detector 610, a flag file and/or other indication or a soft delete as written by the system flagger 510 as described above with respect to FIG. 5. In one example, the flag detector 610 can be implemented via a run control script, which can be modified to look for the flag file and/or other indications of a soft delete.

In the event that a flag file or other soft delete indicator is found on a volume 32 by the flag detector 610, the flag detector 610 can cause a data reader 620 to read respective ones of the snapshots 40, e.g., to optimize loading of the snapshots 40 onto their corresponding volumes 32. In one example, the data reader 620 can be implemented via one or more suitable commands, such as a Unix-based dd command, that reads all of the drives in the system out to/dev/null or another suitable location.

The data reader 620 can facilitate reading of the snapshots 40 as described above to avoid reduced performance associated with the snapshots being "lazily loaded," e.g., using a background copy process for the snapshot, which can be the default method of snapshot recovery in some implementations. Such a background copy process can cause some blocks of the snapshot to be read more slowly than others, which can result in degraded block read performance until the whole snapshot is read. In contrast, the data reader 620 can force traversal of each of the blocks of a given volume 32 by reading out its corresponding snapshot 40 to/dev/null or another suitable location, resulting in the contents of the snapshot 40 being read into its corresponding volume 32 faster than it would be via a background copy process.

Returning to FIG. 4, once all of the volumes 32, VMs 22, and network configuration associated with the new cluster 12 have been generated, each of the VMs 22 of the cluster 12 can be started to reform the cluster 12. In an implementation, the boot process for a VM 22 as shown in FIG. 4 can be similar to techniques used for performing a node tango after a clean shutdown. This means that the journal will be restored from a journal backup partition on an operating system disk associated with the VM 22, after which the VM 22 can be made functional. Finally, once all VMs 22 in the cluster 12 are confirmed to be up, the cluster 12 can be made available for use by a system user, e.g., the same system user associated with cluster 10 as described above.

One or more implementations as described herein can provide the ability to tear down a cluster 10 when a soft delete is initiated and easily bring back up a new cluster 12 while retaining the same configuration and data from the previously deleted cluster 10. Additionally, implementations described herein can be used to soft delete and restore a cluster in a manner that saves substantially on cost as compared to conventional techniques.

Figure 7:
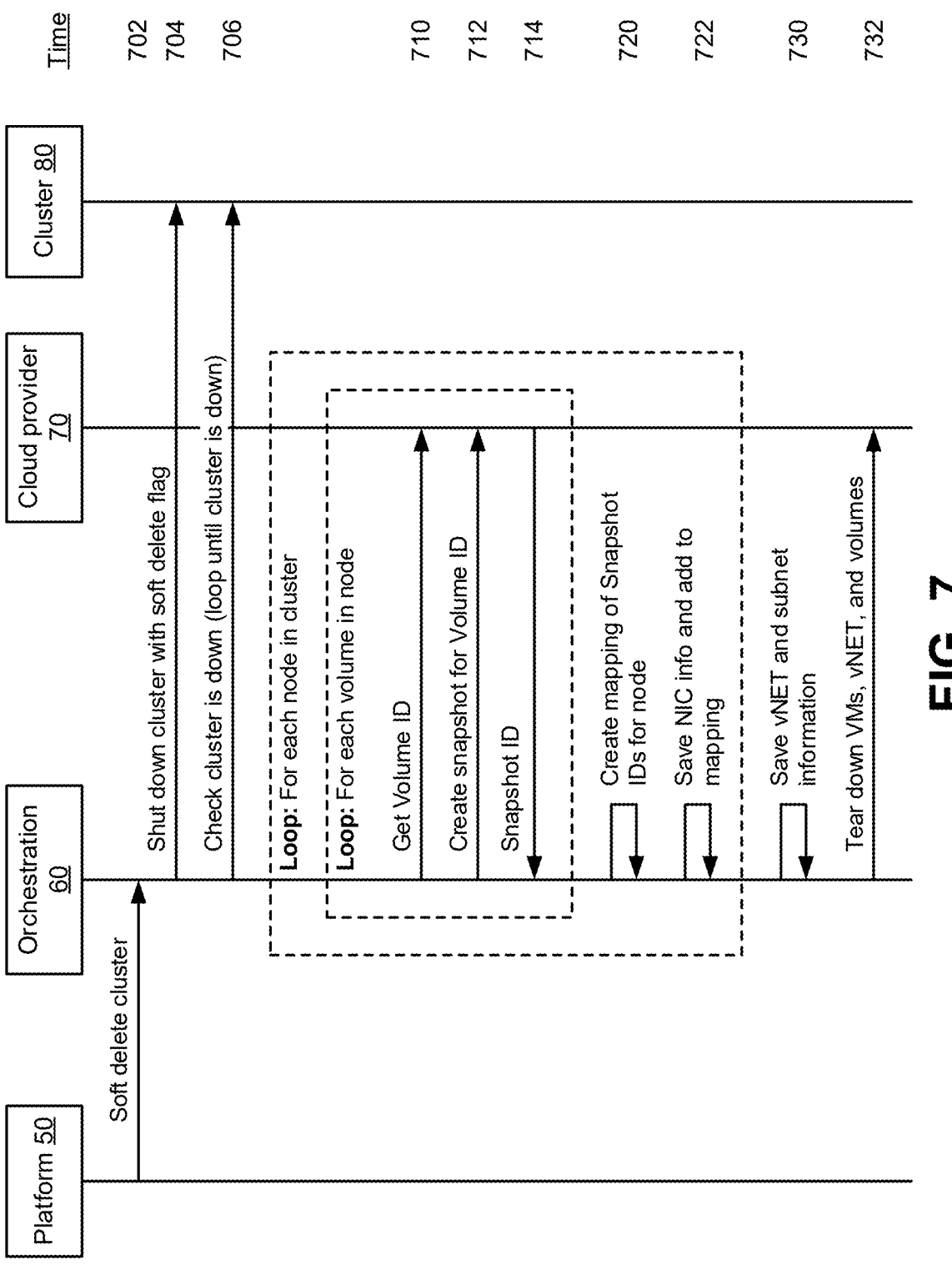
FIGS. 7-8 are diagrams illustrating respective procedures that can be utilized in connection with one or more implementations described herein.
Figure 8:
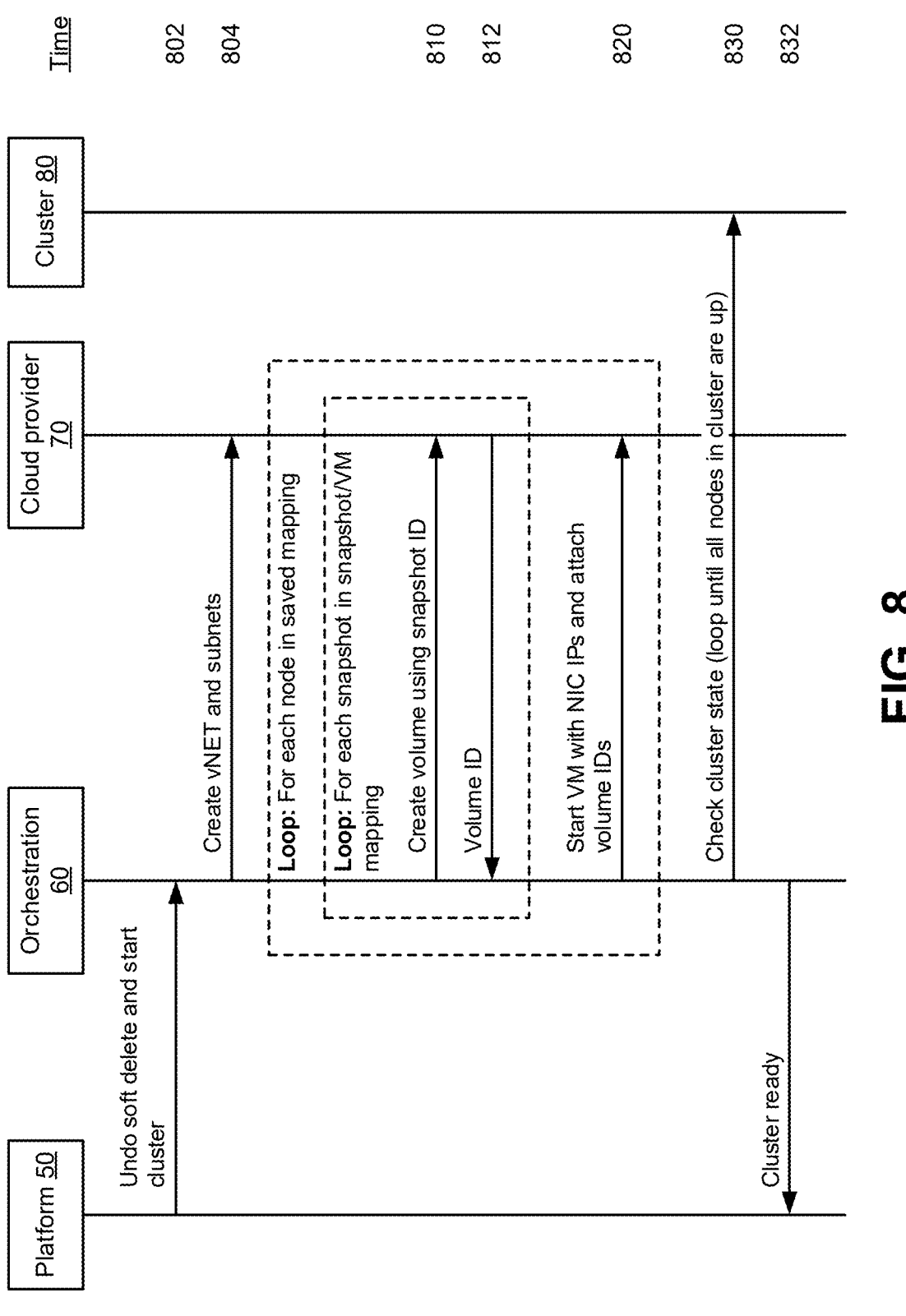

Turning next to FIGS. 7-8, diagrams illustrating respective procedures that can be performed in connection with one or more implementations described herein are illustrated. Referring first to FIG. 7, an example procedure that can be performed by an aaS platform 50, in coordination with an orchestration engine 60, to soft delete a cluster 80 associated with a cloud provider 70 is illustrated. The procedure shown by FIG. 7 begins at time 702, at which the aaS platform 50 instructs the orchestration engine 60 to soft delete the cluster 80. In response to this instruction, the orchestration engine 60 can shut down the cluster 80 at time 704. The cluster 80 can additionally set a soft delete flag during shutdown, e.g., as described above with respect to FIG. 5, to assist in recovering the cluster 80 later. At time 706, the orchestration engine 60 can then check the status of the cluster 80, e.g., at regular intervals, until the cluster 80 is determined to have shut down successfully.

Once the cluster 80 has been shut down, the orchestration engine 60 can get a volume identifier for a volume associated with a node of the cluster 80 from a cloud provider 70 associated with the cluster 80, as shown at time 710. At time 712, the orchestration engine 60 can instruct the cloud provider 70 to create a snapshot for the volume identifier retrieved at time 710. At time 714, the cloud provider can create the snapshot and provide an associated snapshot identifier back to the orchestration engine 60. The operations shown at times 710-714 can then be repeated for each volume associated with the node.

Once snapshots have been created for each volume of the node, the procedure shown in FIG. 7 can proceed to time 720, at which the orchestration engine 60 can create a mapping of the snapshot identifiers for the node, e.g., as a mapping between those snapshot identifiers and an instance identifier of the node. Next, at time 722, the orchestration engine can save the NIC information associated with the node and add that information to the mapping created at time 720. The operations shown at times 710-722 can then be repeated for each node in the cluster 80, e.g., by creating volume snapshots for each node as shown at times 710-714 and creating mapping information for each node as shown at times 720-722.

After the operations shown at times 710-722 have been iterated for each node in the cluster 80, the orchestration engine 60 can save vNET and subnet information associated with the cluster 80, as shown at time 730. Next, at time 732, the orchestration engine 60 can complete the soft delete of the cluster 80 by instructing the cloud provider 70 to tear down all the VMs, vNET, and volumes associated with the cluster 80.

Turning now to FIG. 8, an example procedure that can be performed to restore a previously soft deleted cluster, e.g., a cluster 80 that was soft deleted as described above with respect to FIG. 7, is shown. The procedure shown in FIG. 8 can be initiated at time 802, in which the aaS platform 50 associated with the cluster 80 can instruct the orchestration engine 60 to undo the soft delete and start the cluster. In response to receiving this instruction, the orchestration engine 60 can instruct the cloud provider 70 associated with the cluster 80 to create the vNET and subnets associated with the cluster 80, e.g., based on the information saved at time 730 as shown above in FIG. 7, at time 804.

Next, at time 810, the orchestration engine 60 can instruct the cloud provider 70 associated with the cluster 80 to create a volume using a snapshot identifier, e.g., a snapshot identifier provided by the cloud provider 70 at time 714 as described above with reference to FIG. 7. At time 812, the cloud provider can create the volume and provide an associated volume identifier back to the orchestration engine 60. The operations shown at times 810-812 can then be repeated for each snapshot in a snapshot to VM mapping associated with the node.

Once each volume for a given node has been created, the procedure shown in FIG. 8 can proceed to time 820, at which the orchestration engine 60 can instruct the cloud provider to start a VM corresponding to the node based on the NIC IP address(es) for the node (e.g., as saved at time 722 as described above with reference to FIG. 7) and to attach the volumes created at times 810-812 to the node. The operations shown at times 810-820 can then be repeated for each node in the saved mapping for the cluster 80, e.g., by creating volumes for each node as shown at times 810-812 and starting each node as shown at time 820.

After the operations shown at times 810-820 have been iterated for each node in the saved mapping for the cluster 80, the orchestration engine 60 can iteratively check the state of the cluster 80 at time 830, looping until all nodes in the cluster are determined to be up. Once all nodes in the cluster 80 are confirmed to have been started, the orchestration engine 60 can indicate to the aaS platform 50 that the cluster 80 is ready for use, as shown at time 832, concluding the process.

Turning to FIG. 9, a flow diagram of a method 900 that facilitates soft deletion and restoration of clustered file systems is illustrated. At 902, in response to receiving an instruction to temporarily disable a computing cluster (e.g., a computing cluster 10), a system comprising at least one processor (e.g., a processor 104) can create (e.g., by a snapshot module 110) snapshots (e.g., snapshots 40) of volumes (e.g., volumes 30) associated with a VM of the computing cluster.

At 904, the system can generate (e.g., by a system mapper 120) mapping data representative of a mapping between snapshot identifiers, of the snapshots of the volumes associated with the VM as created at 902, and an instance identifier of the VM.

At 906, in response to the mapping data being determined to have been successfully generated at 904, the system can delete (e.g., by a node un-instantiator 130) the VM.

Referring next to FIG. 10, a flow diagram of a method 1000 that can be performed by at least one processor, e.g., based on machine-executable instructions stored on a non-transitory machine-readable medium, is illustrated. An example of a computer architecture, including a processor and non-transitory media, that can be utilized to implement method 1000 is described below with respect to FIG. 11.

Method 1000 can begin at 1002, in which the at least one processor can, in response to receiving a command to temporarily disable a computing cluster, create snapshots of volumes attached to a software-defined node of the computing cluster.

At 1004, at least one processor can generate mapping data, representative of a mapping between snapshot identifiers, assigned to the snapshots of the volumes attached to the software-defined node, and a node identifier of the software-defined node.

At 1006, the at least one processor can un-instantiate, in response to the mapping data being determined to have been successfully generated, the software-defined node.

FIGS. 9-10 as described above illustrate methods in accordance with certain embodiments of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain embodiments of this disclosure.

Figure 11:
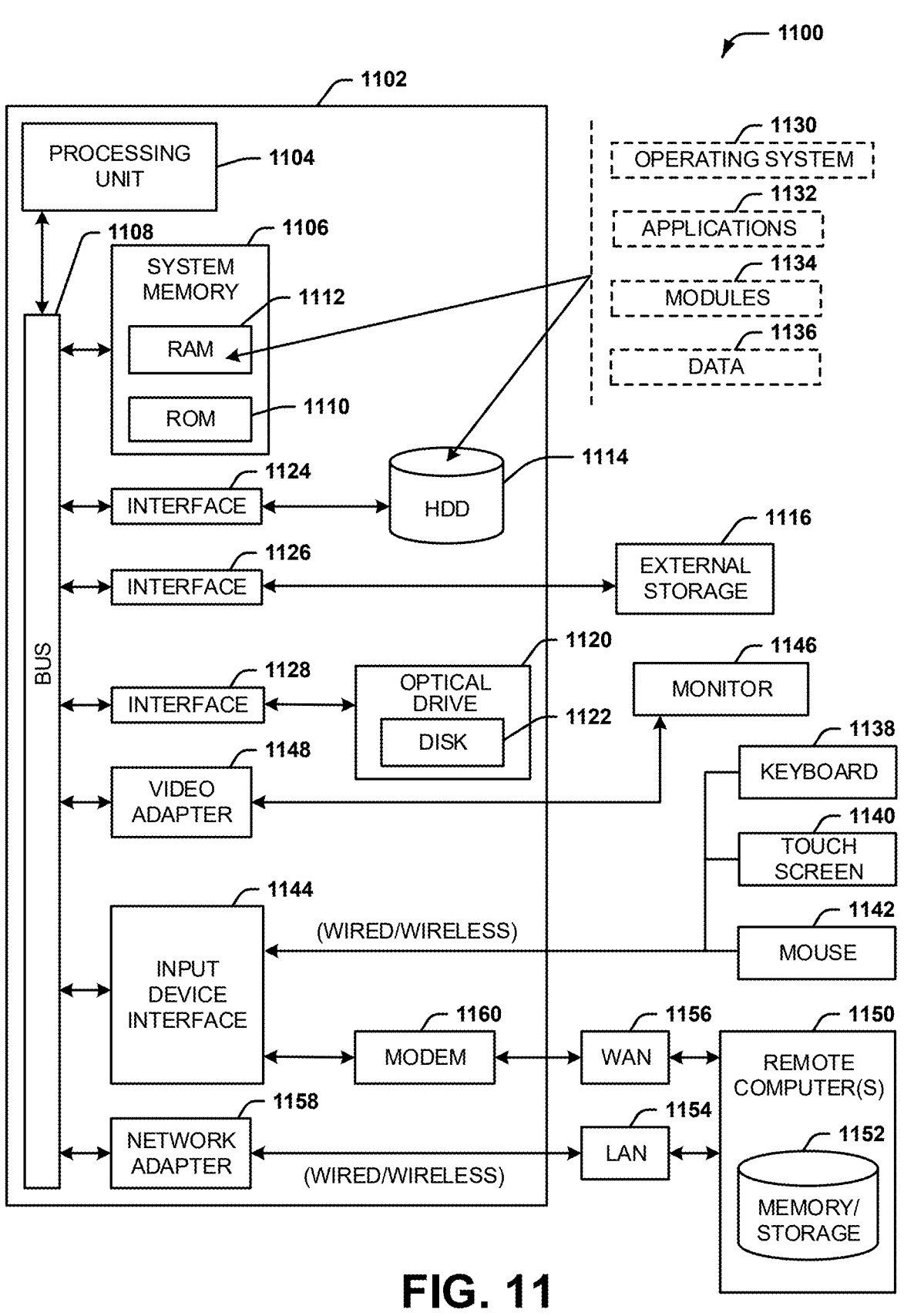
FIG. 11 is a diagram of an example computing environment in which various implementations described herein can function.

In order to provide additional context for various embodiments described herein, FIG. 11 and the following discussion are intended to provide a brief, general description of a suitable computing environment 1100 in which the various embodiments of the embodiment described herein can be implemented. While implementations have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference now to FIG. 11, an example general-purpose environment 1100 for implementing various embodiments described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD), a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1394 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any embodiment or design described herein as "exemplary" and/or "demonstrative" is not necessarily to be construed as preferred or advantageous over other embodiments or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
at least one processor; and
at least one memory that stores executable instructions that, when executed by the at least one processor, facilitate performance of operations, the operations comprising:
in response to receiving a command to temporarily disable a computing cluster, creating snapshots of volumes associated with a virtual machine (VM) that was previously instantiated within the computing cluster;
generating mapping data, representative of a mapping between snapshot identifiers, assigned to the snapshots of the volumes associated with the VM, and an instance identifier assigned to the VM;
in response to the mapping data being determined to have been successfully generated, un-instantiating the VM; and
in response to the un-instantiating of the VM being determined to have successfully completed, disabling the computing cluster.

2. The system of claim 1, wherein the command is a first command, wherein the VM is a first VM, wherein the volumes associated with the first VM are first volumes, and wherein the operations further comprise:
in response to receiving a second command to re-enable the computing cluster:
creating second volumes from respective ones of the snapshots;
instantiating a second VM; and
attaching, based on the mapping data, the second volumes to the second VM.

3. The system of claim 2, wherein the operations further comprise:

in response to the creating of the second volumes, causing the system to read the respective ones of the snapshots, resulting in contents of the respective ones of the snapshots being loaded onto the second volumes.

4. The system of claim 3, wherein the first volumes comprise a first operating system disk, wherein the second volumes comprise a second operating system disk, and wherein the operations further comprise:

in further response to receiving the command to temporarily disable the computing cluster, writing a flag file to the first operating system disk, wherein the causing of the system to read the respective ones of the snapshots is additionally in response to detecting the flag file on the second operating system disk during booting of the second VM.

5. The system of claim 1, wherein the operations further comprise:

in further response to receiving the command to temporarily disable the computing cluster, repeating the creating of the snapshots, the generating of the mapping data, and the un-instantiating for at least one other VM, other than the VM, of the computing cluster.

6. The system of claim 1, wherein the operations further comprise:

shutting down the computing cluster in response to receiving the command to temporarily disable the computing cluster, wherein the creating of the snapshots is further in response to the computing cluster successfully being shut down.

7. The system of claim 1, wherein the volumes associated with the VM are associated with a first type of non-transitory storage media, and wherein the creating of the snapshots comprises creating the snapshots on a second type of non-transitory storage media that is different from the first type.

8. The system of claim 7, wherein the first type of non-transitory storage media is a solid state drive, and wherein the second type of non-transitory storage media is a hard disk drive.

9. The system of claim 1, wherein the mapping data is further representative of a primary network address of a network interface card associated with the VM.

10. The system of claim 1, wherein the operations further comprise:

in further response to receiving the command to temporarily disable the computing cluster, generating topology information for the computing cluster, the topology information comprising a count of the volumes associated with the VM and respective sizes of the volumes associated with the VM.

11. A method, comprising:

in response to receiving an instruction to temporarily disable a computing cluster, creating, by a system comprising at least one processor, snapshots of volumes associated with a virtual machine (VM) that was previously instantiated within the computing cluster;

generating, by the system, mapping data representative of a mapping between snapshot identifiers, of the snapshots of the volumes associated with the VM, and an instance identifier of the VM;

in response to the mapping data being determined to have been successfully generated, deleting, by the system, the VM; and in response to the deleting of the VM being determined to have successfully completed, disabling the computing cluster.

12. The method of claim 11, wherein the instruction is a first instruction, wherein the VM is a first VM, wherein the volumes associated with the first VM are first volumes, and wherein the method further comprises:

in response to receiving a second instruction to re-enable the computing cluster:

creating, by the system, second volumes from respective ones of the snapshots;

instantiating, by the system, a second VM; and attaching, by the system and based on the mapping data, the second volumes to the second VM.

13. The method of claim 12, further comprising:

in response to the creating of the second volumes, reading, by the system, the respective ones of the snapshots, resulting in contents of the respective ones of the snapshots being loaded onto the second volumes.

14. The method of claim 13, wherein the first volumes comprise a first operating system disk, wherein the second volumes comprise a second operating system disk, and wherein the method further comprises:

writing, by the system and in further response to receiving the instruction to temporarily disable the computing cluster, a file to the first operating system disk, wherein the reading of the respective ones of the snapshots is additionally in response to detecting the file on the second operating system disk during booting of the second VM.

15. The method of claim 11, further comprising:

repeating, by the system and in further response to receiving the instruction to temporarily disable the computing cluster, the creating of the snapshots, the generating of the mapping data, and the deleting for at least one other VM of the computing cluster instead of performing the creating, the generating and the deleting for the VM.

16. A non-transitory machine-readable medium comprising computer executable instructions that, when executed by at least one processor, facilitate performance of operations, the operations comprising:

in response to receiving a command to temporarily disable a computing cluster, creating snapshots of volumes attached to a software-defined node that was previously instantiated within the computing cluster;

generating mapping data, representative of a mapping between snapshot identifiers, assigned to the snapshots of the volumes attached to the software-defined node, and a node identifier of the software-defined node;

un-instantiating, in response to the mapping data being determined to have been successfully generated, the software-defined node; and disabling, in response to the un-instantiating being determined to have been successfully completed, the computing cluster.

17. The non-transitory machine-readable medium of claim 16, wherein the command is a first command, wherein the software-defined node is a first software-defined node, wherein the volumes attached to the first software-defined node are first volumes, and wherein the operations further comprise:

in response to receiving a second command to re-enable the computing cluster:

creating second volumes from respective ones of the snapshots;

instantiating a second software-defined node; and attaching, based on the mapping data, the second volumes to the second software-defined node.

18. The non-transitory machine-readable medium of claim 17, wherein the operations further comprise:

in response to the creating of the second volumes, reading the respective ones of the snapshots, resulting in contents of the respective ones of the snapshots being loaded onto the second volumes.

19. The non-transitory machine-readable medium of claim 18, wherein the first volumes comprise a first operating system disk, wherein the second volumes comprise a second operating system disk, and wherein the operations further comprise:

in further response to receiving the command to temporarily disable the computing cluster, writing a file to the first operating system disk, wherein the reading of the respective ones of the snapshots is additionally in response to detecting the file on the second operating system disk during booting of the second software-defined node.

20. The non-transitory machine-readable medium of claim 16, wherein the operations further comprise:

in further response to receiving the command to temporarily disable the computing cluster, repeating the creating of the snapshots, the generating of the mapping data, and the un-instantiating for at least one other software-defined node, other than the software-defined node, of the computing cluster.

\* \* \* \* \*